July 31, 1934.  W. E. JOHNSTON  1,968,150
FURNACE REGULATOR
Filed July 17, 1930   5 Sheets-Sheet 1

INVENTOR
WAYBURN E. JOHNSTON
BY
ATTORNEY

July 31, 1934.   W. E. JOHNSTON   1,968,150
FURNACE REGULATOR
Filed July 17, 1930   5 Sheets-Sheet 2
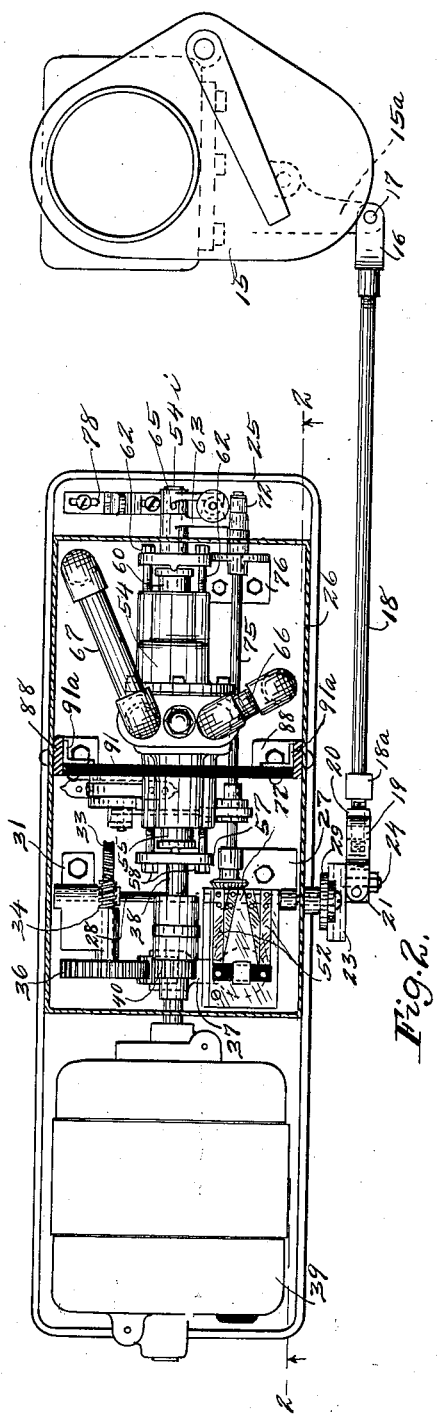
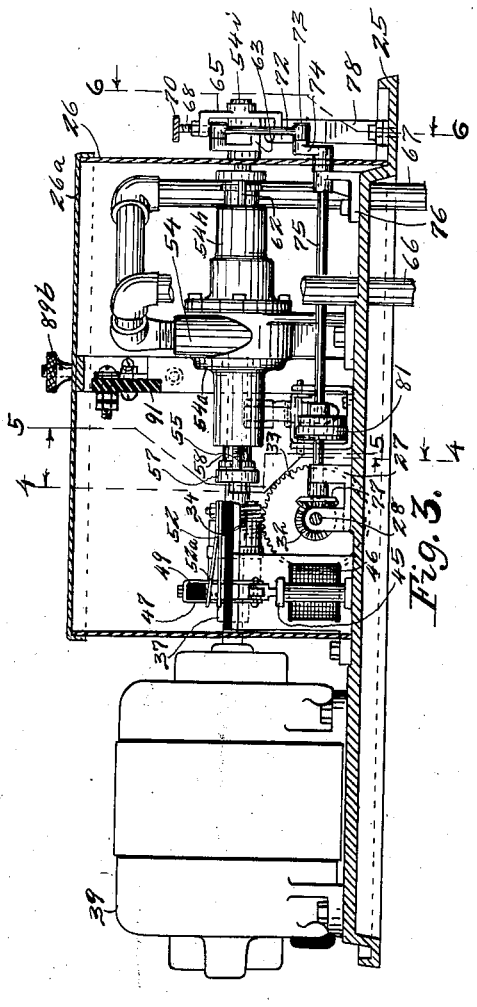
INVENTOR
WAYBURN E. JOHNSTON
BY
ATTORNEY

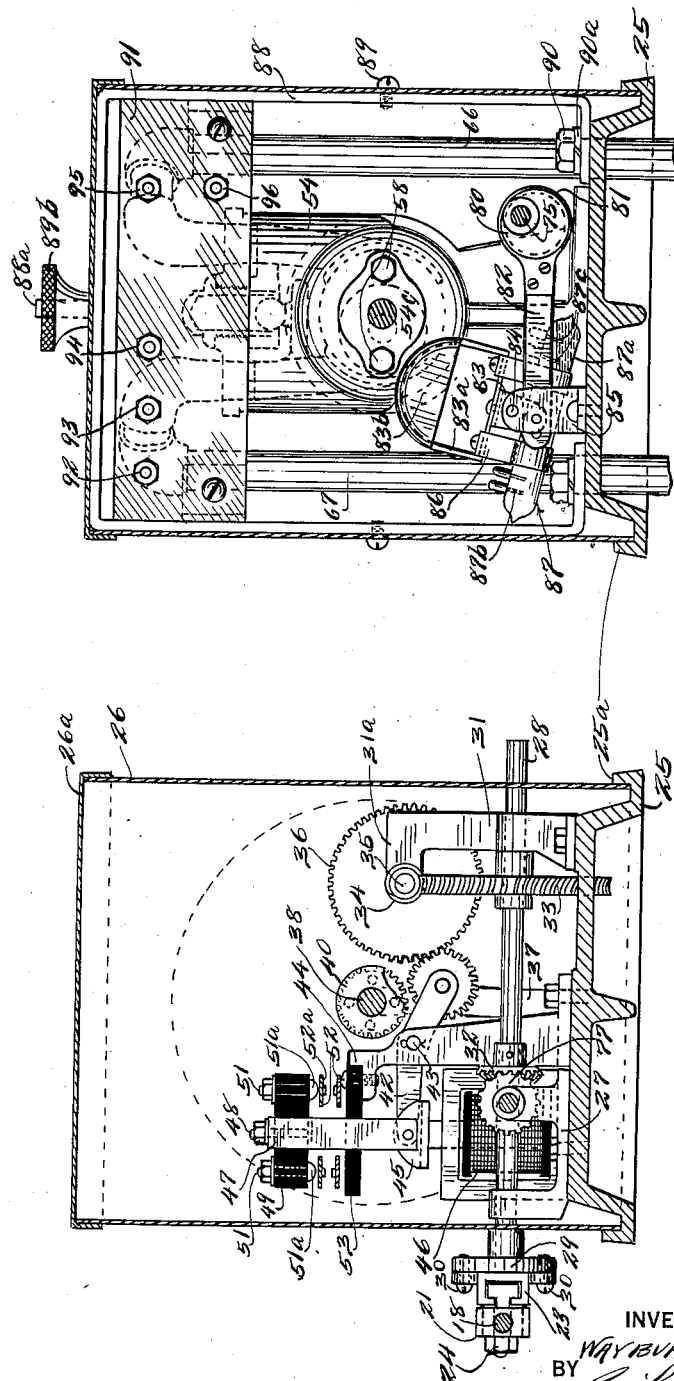

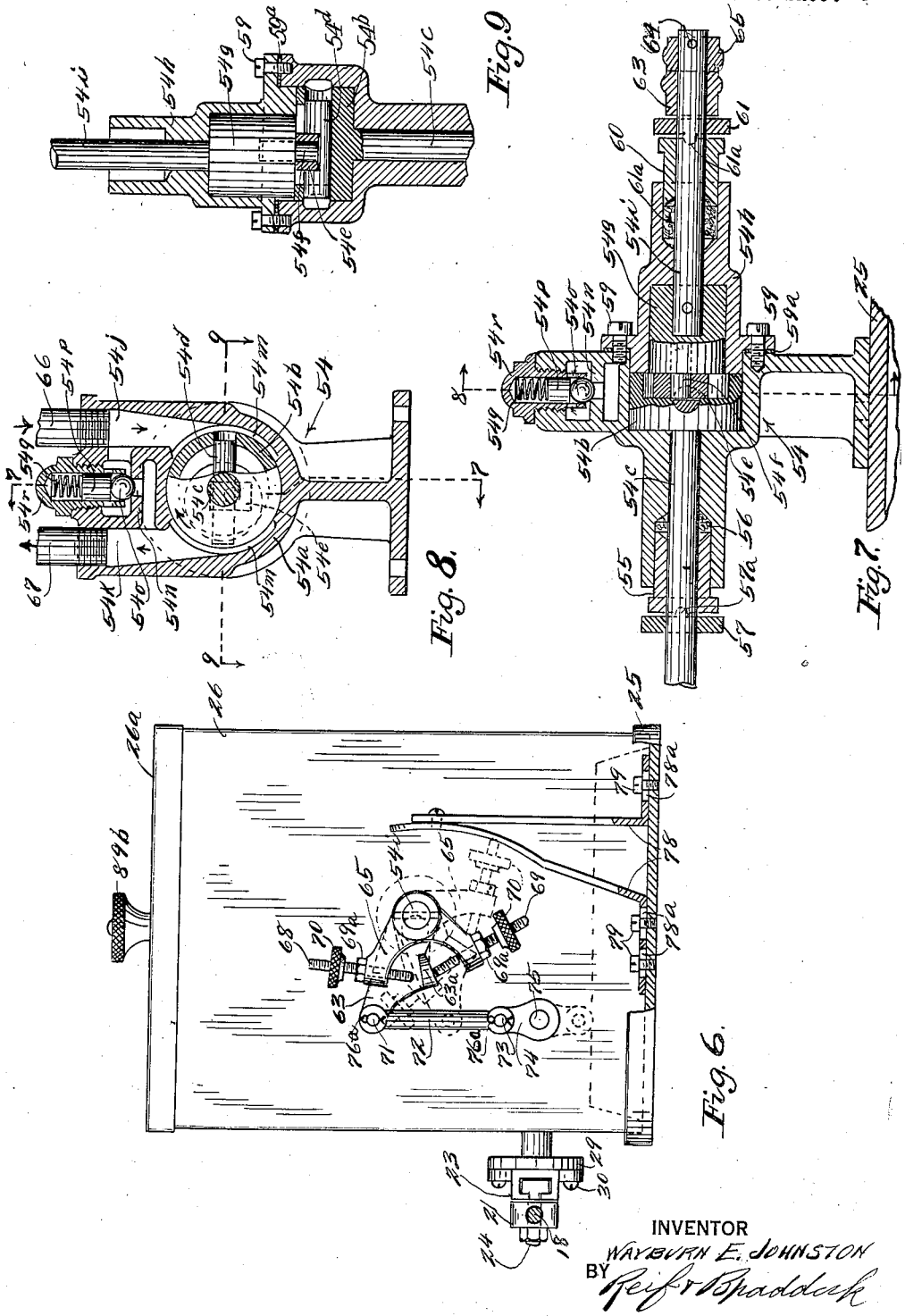

July 31, 1934.  W. E. JOHNSTON  1,968,150
FURNACE REGULATOR
Filed July 17, 1930   5 Sheets-Sheet 5

INVENTOR
WAYBURN E. JOHNSTON
BY Reif & Braddock
ATTORNEY

Patented July 31, 1934

1,968,150

UNITED STATES PATENT OFFICE 1,968,150

FURNACE REGULATOR

Wayburn E. Johnston, Minneapolis, Minn.

Application July 17, 1930, Serial No. 468,689

8 Claims. (Cl. 236—15)

This invention relates to a furnace control device or control device for a burner which heats a furnace or other member. Heat treating furnaces, used for annealing castings and other objects, forge, and other furnaces, are now commonly used, and it is quite important to have the temperature closely regulated in such furnaces and at the same time to maintain the right kind of atmosphere. It is, of course, also desirable to have a control or regulator which is automatic. The burners used for heating the furnace usually use liquid fuel or oil and air. The control devices and regulators of the prior art have used valves for regulating the oil supply. The oil generally used for furnace heating is a heavy residue oil, and this oil contains numerous lumps or clots of semi-solid matter, as well as sand and other sediment. When regulation is attempted by closing or partially closing a valve or otherwise diminishing the passage through which the oil passes, the lumps in the oil tend to collect at the restricted point and this action increases until the free flow of oil is prevented. The valves also tend to stick, and it is difficult to move the valve the required distance to give the desired regulation.

It is an object of the present invention, therefore, to provide an automatic regulator device for a burner or furnace, in which both the oil and air supplied to the burner are regulated, and the oil supply is varied, while maintaining the passage through which the oil passes at its regular size to the burner.

It is a further object of the invention to provide an automatic regulating device comprising an oil supplying device such as a metering device or pump which is constantly driven, and which can be adjusted to vary the amount of oil delivered, automatic means controlled by the temperature of the furnace being provided for adjusting said oil supplying device and simultaneously regulating the supply of air.

It is another object of the invention to provide an automatic control device comprising a device for positively delivering oil, having means for varying the amount of oil delivered thereby, a driving means for said device, an air regulating valve for the burner controlled, a mechanism adapted to be connected to said driving means for adjusting said device to vary the delivery therefrom and to simultaneously adjust said valve, an electrically operated means being provided for connecting said mechanism to said driving means, which electrically operated means is controlled by the temperature produced by said burner.

It is still further an object of the invention to provide an automatic control device for a furnace or the burner heating the same, comprising a means responsive to the temperature of the furnace, an electrical circuit controlled by said means, an oil supplying means for said burner, an adjustable member through which the air supplied to said burner passes, a movable member for varying the oil supplied by said air supplying means, a mechanism for simultaneously moving said movable member and adjusting said member through which the air passes, and means actuated by the closing of said electrical circuit for throwing into operation said mechanism.

It is more specifically an object of the invention to provide an automatic control device, comprising a constantly driven pump adjustable to vary the discharge therefrom, an air regulating valve for said burner, a motor for constantly driving said pump, a mechanism for variably adjusting said pump and connected to the air valve for variably adjusting the same, a solenoid for connecting said mechanism to said motor to be driven thereby, and a temperature responsive means responsive to the temperature of the furnace for closing and opening an electrical circuit for controlling said solenoid.

These and other objects and advantages of the invention will be fully set forth in the following description made in connection with the accompanying drawings, in which like reference characters refer to similar parts throughout the several views, and in which:—

Fig. 2 is a plan view of a portion of the device, the enclosing casing being shown in horizontal section;

Fig. 3 is a vertical section taken on line 2—2 of Fig. 2, as indicated by the arrows;

Fig. 4 is a vertical section taken on line 4—4 of Fig. 3, as indicated by the arrows;

Fig. 5 is a vertical section taken on line 5—5 of Fig. 3 as indicated by the arrows;

Fig. 6 is a vertical section taken on line 6—6 of Fig. 3, as indicated by the arrows;

Fig. 7 is a vertical section taken on line 7—7 of Fig. 8, as indicated by the arrows;

Fig. 8 is a vertical section taken on line 8—8 of Fig. 7, as indicated by the arrows;

Fig. 9 is a horizontal section taken on line 9—9 of Fig. 8, and

Figure 1:
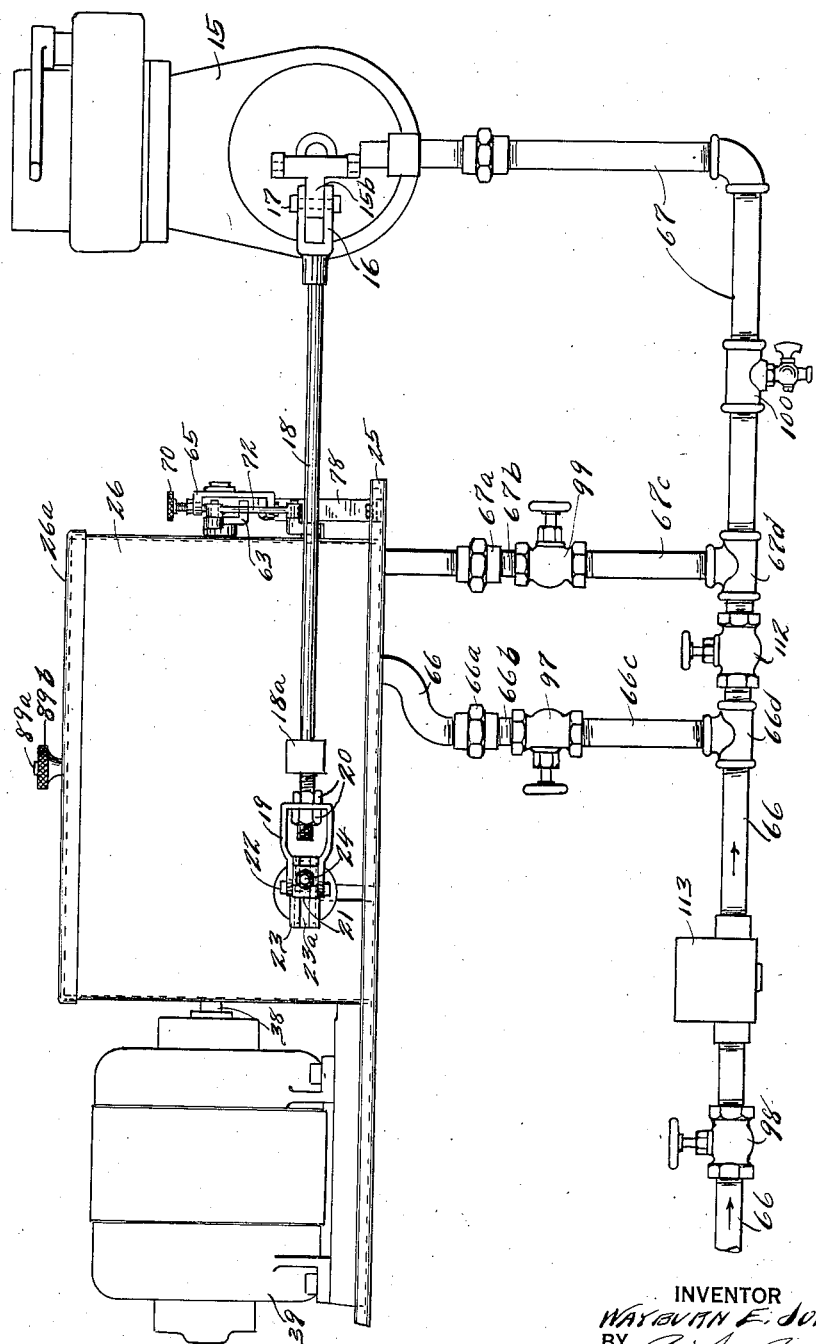
Fig. 1 is a view in side elevation of the device.

Referring to the drawings, an automatic control device is shown, comprising an air regulating valve 15. The air supplied to the burner which heats the furnace or other device passes through the valve 15 and this valve has a lever 15a thereon by means of which it can be closed more or less for regulating the supply of air to the burner. The lever 15a has an operating arm 15b embraced by the fork 16 and connected thereto by the headed and nutted bolt 17, which fork is connected to a link 18 extending to a yoke member 19. The end of link 18 passes through the end of yoke 19, said link being threaded and nuts 20 are disposed on said link at either side of said end of said yoke. Block 18a connects the threaded end of link 18 to the intermediate portion, which latter portion may be made of pipe or tubing. Yoke 19 has spaced arms extending at either side of a block 21 and pivotally connected thereto by a headed and nutted bolt 22, said block having a portion slidably disposed in the T slot 23a of a crank arm 23. Block 21 is pivotally connected to crank arm 23 by a T-headed bolt 24 disposed in the slot 23a and extending outwardly through block 21 and equipped with a suitable nut. The control device proper is mounted on a base member 25, and while this member may be variously formed, in the embodiment of the invention illustrated it is shown as an elongated cast plate. Most of the parts of the regulator, excepting the motor, are arranged to be covered by a sheet metal casing 26 having a removable cover 26a, said casing having an open end and resting on base 25 inside of its peripheral flange 25a. A bracket 27 is secured to base 25 adjacent one corner thereof, and carries a bearing for a shaft 28, which shaft extends through the side of casing 26 and has secured thereto a disk 29 to which the crank arm 23 is bolted, said crank arm having lugs on either side connected to disk 29 by the screws 30. Shaft 28 extends transversely of the base 25 and casing 26 and is also journaled in a bracket 31 secured at the opposite side of the base 25. Said shaft has secured thereto a small beveled gear 32, and also has secured thereto a worm wheel gear 33. Gear 33 meshes with a worm gear 34 secured to a shaft 35 which is journaled in a bearing 31a at the top of bracket 31, and has secured thereto at the end of said bearing, opposite worm 34, a spur gear 36. A bracket 37 is secured to base 25 and has a bearing at its upper end in which is journaled a shaft 38 forming the driving or armature shaft of an electrical motor 39 mounted on one end of base 25 outside of casing 26, said shaft 38 extending through the end of said casing. A gear 40 is secured to shaft 38, laterally alined with gear 36 and a gear 41 meshing with gear 36 is carried on a lever 42 pivoted by pivot 43 to a bracket 44 also secured to base 25 adjacent the bracket 27. Lever 42 is adapted to be swung to move gear 41 to mesh with gear 40 at certain times, so that gear 36 can be driven from gear 40. Lever 42 has pivotally connected to one end thereof a plate 45 forming the armature for an electro-magnet or solenoid 46 suitably mounted in a portion of bracket 27. Plate 45 as shown in Fig. 3 has arms extending at either side of the end of lever 42 and member 47 is shown as a U-shaped yoke having the ends of its arms pivotally connected at the sides of said arms of plate 45. Member 47 has secured in its upper end by the headed and nutted bolt 48, a block 49 of insulating material, at either side of which is secured a headed and nutted bolt 51 having washers under the nuts thereof on the top of said block, and having rounded heads 51a disposed at the under side of said block. Said heads 51a are adapted to engage the top member 52a of switches 52, which switches are carried on and secured to a block 53 of insulating material secured to the top of bracket 44. A pump 54 is provided, having a base flange secured to base plate 25, which pump is arranged to be constantly driven but to deliver different quantities of oil or liquid. Said pump comprises a housing 54a having a cylindrical chamber in which is fitted a head 54b secured to and adapted to be turned by a shaft 54c extending through a hub projecting through housing 54a, which hub is bored at its end to receive a packing gland 55 adapted to engage suitable packing 56 and press the same about shaft 54c. Said gland 55 has an end flange with grooves therein adapted to be engaged by ribs 57a on a holding and adjusting member 57 through which shaft 54c passes and which is secured to the hub of housing 54a by the headed screws 58 passing therethrough and threaded into said hub. Shaft 54c in practice is connected by a suitable coupling to the motor shaft 38. Head 54b has extending therethrough a transverse cylindrical bore in which is disposed a plunger 54d. Plunger 54d has a rectangular groove extending transversely thereof, in which is fitted a block 54e. Said block 54e has a hole formed therein, in which is disposed and rotatable a pin 54f which projects eccentrically through a cylindrical block 54g fitted in the cylindrical bore in a cap 54h bolted to housing 54a by the cap bolts 59 which cap has a cylindrical portion at its front end adapted to fit in the bore in housing 54a and engage the head 54b. A gasket 59a is disposed between cap 54h and housing 54a. The cap 54h is bored at its outer end to receive a packing gland 60 adapted to press packing 61a about shaft 54i which is secured to block 54g and projects outwardly through cap 54h. Gland 60 has an outer flange with grooves at the sides thereof into which extend ribs 61a on a holding and adjusting member 61 through which shaft 54i passes and which is secured to gland 60 by the headed screws 62. Shaft 54a extends through the end of casing 26 and has journaled thereon the hub of lever 63 and has secured to its outer end in any suitable manner, as by the pin 64, a bell crank 65. The housing 54a has passages 54j and 54k at either side thereof, communicating with semi-annular grooves 54m formed in said housing at either side of head 54b and conduits 66 and 67 lead respectively from the passages 54j and 54k. The housing comprises a diaphragm 54n, the under side of which communicates with passage 54j and which has an opening therethrough, the upper side of which is formed as a valve seat, adapted to be engaged by a check valve 54o, shown as in the form of a ball, the same being engaged by plunger 54p engaged at its top by a coiled compression spring 54q held in the bore of cap member 54r threaded into the top of housing 54a. The top of the diaphragm 54n communicates with the passage 54j as shown in Fig. 8. The lever 63 has a projecting plate or lip 63a projecting outwardly therefrom and the same is adapted to engage in the oscillation of said lever with either of a pair of screws 68 and 69 threaded respectively in the arms of a bell crank lever 65a, the same being provided with jamb nuts 69a engaging the arms of lever 65. The screws 69 are also provided with adjusting knurled wheels 70. Lever 63 has a hub at its outer end pivotally connected by pivot 71 preferably in the form of a headed screw, to a link 72 which is in turn pivotally connected at its other end by the pivot 73 to crank arm 74 secured to the end of a shaft 75 which extends through the end of casing 26. Pivots 71 and 73 are shown as provided with cotter pins 76a. The shaft 75 is journaled in a bearing 76 secured adjacent one end of base plate 25 and also in a bearing carried on bracket 27. The shaft 75 has secured to its inner end a beveled gear 77 which meshes with gear 32. A bracket 78 is secured to the end of base plate 25 by screws 79, the latter passing through elongated slots 78a in the base of bracket 78, so that said bracket can be adjusted transversely of said base. Bracket 78 has a concave upper portion adapted to be engaged at times by the end of screw 69. The shaft 75 has secured thereto intermediate its ends an eccentric 80 embraced by an eccentric strip 81 which has extending therefrom and secured thereto, an arm 82. Arm 82 is pivotally connected to the lower end of a lever 83, which lever is pivoted about a pivot 84 and a bracket 85 secured to base 25. As shown in Fig. 3, lever 83 has a downwardly directed fork and bracket 85 is of U-shape. Arms 86 extend downward from lever 83 and carry a mercury tube switch 87. Switch 87 comprises a tube having mercury 87a therein, adapted to extend about pairs of contacts 87b and 87c adjacent the ends of said tube, said contacts extending through the side of said tube and adapted to have electrical conductors secured thereto. Bracket 83 has arms 83a extending upwardly therefrom, carrying a weight 83b adapted to assist in oscillating switch 87. A rectangular bracket 88 extends about the top of the sides of casing 26 and is secured thereto by small screws 89. Bracket 88 is secured to base member 25 by screws 90 shown as having split spring washers 90a beneath the heads thereof. A screw 88a extends upward from bracket 88, passing through a hole in the removable cover 26a, and a knurled thumb nut 89b is threaded on screw 88a to hold said cover in place. A block of insulating material 91 is secured to bracket 88 by means of small angle brackets 91a, said block extending across the top of casing 26. Block 91 carries a plurality of contact members 92, 93, 94, 95 and 96 to which conductors are connected, which conductors are included in the electrical circuit used with the device, and to be later described. The conduit 66 is shown as having a coupling 66a therein securing the same to a nipple 66b connected to a valve member 97. Another nipple 66c connects valve 97 to the T 66d connected to a horizontal portion of conduit 66, also shown as equipped with a valve 98, which conduit beyond the valve leads to a source of oil supply. The discharge conduit 67 is also shown as equipped with a coupling 67a to which is connected nipple 67e connected to the valve 99. Another nipple 67c connects the valve 99 to T 67b from which leads the horizontal portion of conduit 67 provided with a drain cock 100. Conduit 67 extends upward and will be connected to the oil connection of the burner. T's, 66d and 67d are connected to a valve 112 therebetween. A strainer 113 is disposed in conduit 66.

Figure 10:
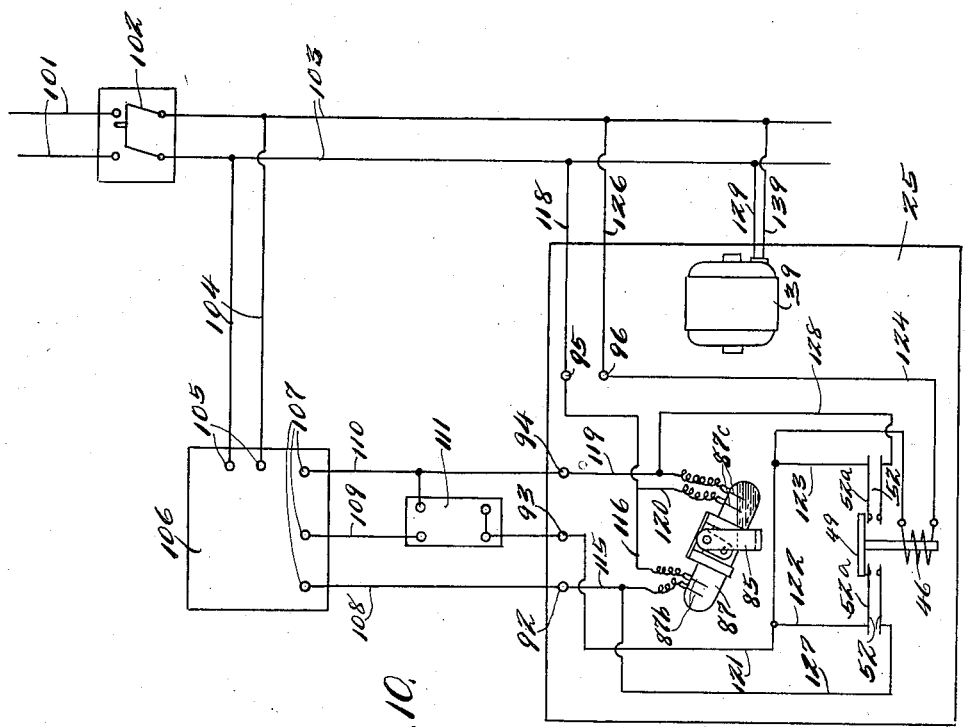
Fig. 10 is a wiring diagram of the device.

In Fig. 10 the wiring diagram for the device is shown. The line supply conductors are shown as 101 and are shown as connected to a control switch 102. Conductors 103 extend from switch 102 and a pair of conductors 104 are connected respectively to conductors 103 and extend to contacts 105 forming part of the pyrometer or temperature responsive device 106. Such pyrometers or temperature responsive devices are now well known pieces of commercial apparatus, and the specific construction thereof forms no part of the present invention and is not shown. Three other contacts 107 are shown as part of the pyrometer, and conductors 108, 109 and 110 lead respectively from these contacts. Conductors 109 and 110 are connected to a three-way switch 111. Conductors 108, 109 and 110 are connected to posts or contact members 92, 93 and 94 respectively. A conductor 115 leads from post 92 to one of the contact members or terminals 87b of switch 87. A conductor 116 leads from the other terminal 87b and is connected to a contact member or post 95 which in turn is connected by conductor 118 to one line conductor 103. A conductor 119 connects contact 94 to one of the terminals 87c of the switch 87, and the other terminal 87c is connected by a conductor 120 to conductor 116. A conductor 121 extends from contact 93 to one terminal of the magnet or solenoid 46. Conductors 122 and 123 extend respectively from conductor 121 to contacts 52a of the switches 52. A conductor 124 extends from the other end of solenoid 46 to a contact 96, and a conductor 126 extends from contact 96 to the conductor 103 other than the one to which conductor 118 is connected. The other contact of one switch 52 is connected by a conductor 127 to the conductor 115 and the other contact of the other switch 52 is connected by conductor 128 to conductor 119. Motor 39 is shown and is connected by conductors 129 and 139 respectively to conductors 103.

With the parts as described, the operation is as follows:—The pyrometer 106 will be disposed in the furnace or device, the temperature of which is to be regulated. As stated, the conduit 67 supplies oil to the burner, heating the furnace or other member, and the air is supplied through the valve 15. The pyrometer is set to operate at a certain temperature. While the present device can be used in various places, the embodiment of the invention illustrated is particularly designed for regulation of high-temperature furnaces. The motor 39 is continuously driven so that pump 54 is continuously driven, and oil is positively supplied to the burner. It will be seen from Figs. 7, 8, and 9 that pin 54f is eccentric to the axis of head 54b and shaft 54c. When head 54b is driven, block 54e slides in the groove in plunger 54d and plunger 54d is reciprocated in head 54b. It will be seen that the eccentricity of the pin 54f can be varied by turning shaft 54i. Pin 54f can be brought to a position co-axial with shaft 54c and head 54b, and when this occurs, plunger 54d would not be reciprocated. When said pin is at one side of the center, plunger 54d is reciprocated, and is nearer one side of head 54b than the other. When pin 54f is at the other side of the center, plunger 54d is nearer the other side of head 54b. Pump 54 can therefore be set or adjusted so that oil will be taken in conduit 66 and discharged through conduit 67 in varying amounts, or it can be set so that no oil will be delivered. It can also be set so that oil will be taken in at conduit 67 and discharged through conduit 66. With the burner operating, the oil is taken in through conduit 66 and discharged through conduit 67. This is caused by the oil passing from passage 54j into groove 54m and then into the end of the bore in which plunger 54d is disposed. The end of the plunger 54d will be some distance from the end of the bore and when head 54d revolves 180°, the end of said plunger will be moved outward toward the end of the bore, thus forcing oil outward into the other groove 54m and out through passage 54k. The movement of the plunger 54d as stated can be varied by adjustment of pin 54f by turning shaft 54i. The amount of oil delivered can therefore be varied by turning shaft 54i. It will be apparent that when bell crank 65 is turned, that shaft 54i will be turned, and the discharge of the pump varied. It will also be seen that when lever 63 is swung sufficiently, that one of the screws 68 or 69 will be engaged by the lip 63a and that bell crank lever 65 will be turned. In the operation of the device, shaft 75 is rotated 180°, and the desired movement is imparted to bell crank lever 65 by adjustment of the screws 68 and 69 in said bell crank. The device is arranged so that shaft 75 is turned 180° at intervals. It will be apparent that when shaft 75 rotates 180° that shaft 28 which drives shaft 75 through beveled gears 32 and 77, will also rotate 180°, and that crank arm 23 will be rotated 180°. If block 21 is set eccentrically of said crank, then yoke 19 and link 18 will be moved so that lever 15b will be swung and air valve 15 opened or closed a certain amount. It is obvious that block 21 and bolt 24 can be disposed at different places in crank 23 and the amount of the movement given to lever 15b varied. The length of the link 18 can also be varied by adjustment of the nuts 20. In setting the link 18, the air control lever 15a is set in central position. The bolt 24 is set in the center of crank 23. This will determine the length of link 18. The amount of throw will then be determined by moving the air control lever to the position in which it is to be moved for the desired regulation. The shaft 75 will be driven by shaft 28 which is driven through worm wheel gear 33, worm 34, and gear 36. Gear 40 is constantly driven with the motor shaft, and gear 41 is at desired times swung upward by lever 42 into mesh with gear 40 so that shaft 35 will be driven.

With the furnace operating, when the temperature drops to a certain point, the pyrometer 106 acts to connect conductors 109 and 110 at the contacts 107 and solenoid 46 is then actuated through a circuit which may be traced as follows:—From one line conductor 103 through conductor 126 to post 96, thence through conductor 124 to solenoid 46, through said solenoid and thence by conductor 121 to post 93, through conductor 109 and switch 111 to one of the posts 107, then to the other post 107 and through conductor 110 to post 94, thence through conductor 119 through the switch 87 and contacts 87c, through conductor 120 to conductor 116 and then to post 95, then from post 95 through conductor 118 to the other line conductor 103. As soon as solenoid 46 is energized, armature 45 is drawn downward, oscillating lever 42 and moving gear 41 into engagement with the gears 40. The motor is now connected to shaft 28 and this shaft and shaft 75 begin to rotate. As shaft 75 rotates, eccentric 80 is rotated, and this moves bar 82, thus swinging lever 83 and oscillating switch 87. The weight 33b, after passing the vertical, assists in oscillating switch 87. The mercury 87a now flows from one end of the switch 87 to the other and the circuit just traced is broken through conductors 87c. This movement is timed so that shafts 75 and 28 have revolved 180°. Crank 23 has thus revolved 180° and link 18 has been moved to regulate the air valve 15. Shaft 75 has simultaneously rotated crank 74 and also rotated lever 63 through the link 72. This oscillates bell crank 65 and shaft 54i is also rotated to change the position of pin 54f, thus adjusting the pump 54 so that it will deliver more oil. The mechanism is thus actuated to simultaneously adjust the supply of oil and air and both will be increased so that more heat will be supplied to the burner. The proper atmosphere will also be maintained in the furnace. When solenoid 46 operates, it also moves member 47 downwardly, and the heads 51 act to close switch 52. This is done to cause a short circuit or to close a circuit which will not have to pass through the contacts 107 of the pyrometer. With switch 52 closed, a circuit can be traced as follows:—

From one line conductor 103 through conductor 126 to post 96, then through conductor 124 to solenoid 46, then through conductor 121 to conductor 123, then through switch 52 through conductor 128 through the contacts 87c of switch 87 and through conductor 120, to conductor 116 and to post 95, and then through conductor 118 to the other line conductor 103. This circuit, of course, will be broken when switch 87 is operated. After switch 87 has operated, the contacts 87b will be connected by the mercury in switch 87. After switch 87 is operated by eccentric 80, solenoid 46 is de-energized and gear 41 drops away from gears 40 and 36, so that shaft 28 is no longer driven. Should the temperature in the furnace now rise again to said point, the contacts 107 to which conductors 109 and 108 are connected, will be connected. This will close a circuit which may be traced from one line conductor 103 through conductor 126 to post 96, thence through conductor 124 to solenoid 46, then through conductor 121 to post 93, through conductor 109 to one contact 107, through the pyrometer contact to the other contact 107, through conductor 108 to the contacts 87b of the switch 87, then through conductor 116 to post 95 and through conductor 118 to the other line conductor 103. Solenoid 46 is again actuated and gear 41 is again moved to connect gears 40 and 36. Shafts 28 and 75 will make another half-revolution and the air valve 15 will be again moved to decrease the supply of air and shaft 54i will be moved as described to adjust pump 54 to decrease the delivery of oil. Less fuel and air will then be supplied to the burner, and at the same time a proper mixture of oil and air will be maintained. The temperature of the furnace will then decrease. The burner and the temperature of the furnace are thus regulated to hold the temperature near said point. When solenoid 46 operated, it again operated to close the switch 52. This closes the circuit, including the solenoid 46, without including the pyrometer contacts. This circuit may be traced from one line conductor 103 through conductor 126 to post 96 then through conductor 124, through solenoid 46, through conductor 121 to conductor 122, then through switch 52 to conductor 127, then to conductor 115 and to the contacts 87b of switch 87, then through conductor 116 to post 95 and through conductor 118 to the other line conductor 103. This circuit will, of course, be broken upon operation of switch 87. As before described, this switch operates after shafts 28 and 75 have made one-half revolution.

The device thus operates under the control of the pyrometer whenever the temperature of the furnace rises to a certain point or falls to said point. The supply of air and oil is automatically changed and the proper mixture of air and oil is maintained. It will be noted that the oil is necessarily regulated without the use of a valve and while maintaining the passage through which the oil passes at its normal size. There therefore is no danger of the oil stream being clogged or any obstruction building up in the oil due to the lumps or impurities therein. The device thus works upon the high-low principle and the low adjustment for both the oil and air must be low enough so the temperature will tend to fall below that desired and the high adjustment for both the oil and air must be high enough so that the temperature will tend to rise above that desired. By thus operating part of the time on low adjustment, and part of the time on high adjustment, the temperature of the furnace or oven is maintained within a few degrees of that desired. The device would work equally well on the on and off principle, where the burner is stopped when the temperature rises to a certain point. The burner is usually operated under manual control when it is initially started and the controller regulated. The three point switch 11 is provided, so that the burner can be held on low adjustment under manual control when slow heating is desired. The bracket 78 is provided as a stop for the screw 69, because the adjusting shaft 54i of the pump has a tendency to turn to the position for no delivery, and this tendency must be resisted by stop bracket 78. This bracket is adjusted so that any tendency of shaft 54i and thus bell crank 65, to turn, will be resisted as indicated by the dotted lines shown in Fig. 6.

From the above description it is seen that applicant has provided a simple, efficient, reliable and positive control device, and one which automatically and simultaneously adjusts the supply of the oil and air without interfering with the oil passage. The furnace or other member heated by the burner is thus kept closely regulated and no attention by the operator, or manual regulation is necessary. The device is quite compact and is well protected by being held in the casing 26. The same has been amply demonstrated in actual practice, has proven very successful, and is being commercially made.

It will, of course, be understood that various changes may be made in the form, details, proportions and arrangement of the parts, without departing from the scope of the applicant's invention, which, generally stated, consists in a device capable of carrying out the objects above set forth, in the novel parts and combinations of parts disclosed and defined in the appended claims.

What is claimed is:—

1. A regulator for a burner using oil and air having in combination, an oil delivering means, a motor for driving said means to continuously deliver oil to said burner, means for adjusting said oil delivering means to vary the delivery thereof, means for regulating the supply of air to said burner, means for operating said adjusting means, means for operating said air regulating means, mechanism for simultaneously actuating said last two mentioned means driven from said motor, means controlled by the temperature created by said burner to connect said last mentioned means to said motor to be driven thereby, and means to disconnect said last mentioned means from said motor.

2. A regulator for a burner using oil and air having in combination, an oil supplying means, an air rgeulating means, a driving means for said oil supplying means, a mechanism adapted to be connected to said driving means for positioning said oil supplying means to vary the delivery thereof, and for simultaneously adjusting said air regulating means, an electrical circuit adapted to be closed by means controlled by the temperature caused by said burner, and an electromagnetic means in said circuit for connecting said mechanism to said driving mechanism.

3. The structure set forth in claim 1, and means operated by said mechanism for breaking said circuit to disengage said electromagnetic means and disconnect said mechanism from said driving means.

4. A regulator for a burner using oil and air having in combination, an oil supplying means, an adjusting shaft turnable for varying the discharge from said means, a driving shaft for said means, means for rotating said driving shaft, an air regulating means, a third shaft connected to said adjusting shaft, and to said air regulating means for simultaneously operating both, means for connecting said third shaft to said driving shaft, and means controlled by the temperature created by said burner for actuating said last mentioned means to cause it to connect said third shaft to said driving shaft to vary the supply of oil and air.

5. A regulator for a burner using oil and air having in combination, a variable discharge pump for delivering oil to said burner, an air regulating valve for varying the air supplied to said burner, adjusting means for said pump to vary the amount of oil discharged therefrom, adjustable members for engaging said adjusting means to adjust said pump more or less in the certain movement of said members, an adjusting mechanism connected to said air regulator valve to close or open the same varying amounts, shafts respectively carrying said adjusting members and adjusting mechanism, means for turning said shaft through half a revolution, and means controlled by the temperature produced by said burner for actuating said shafts to turn the same through a half revolution and simultaneously vary the amount of oil and air supplied to said burner.

6. A regulating means for a device heated by a burner to which liquid fuel and air are supplied, having in combination, a pump for delivering liquid fuel to said burner having a portion thereof movable to different positions to cause said pump to deliver different amounts of liquid, a member through which the air supplied to said burner passes for regulating the passage of air to said burner, a second member rotatable through 180°, adjustable means operated by said second member to move said portion of said pump varying amounts, a crank rotatable through 180°, an adjustable means connecting said crank and said first mentioned member, and means controlled by the temperature of said device for rotating said second member and crank to vary the supply of oil and air.

7. A regulating means for a device heated by a burner, to which oil and air are supplied, having in combination, driven means for delivering oil to said burner having a portion thereof movable to different positions to cause the same to deliver different amounts of oil, a regulating means for the air supplied to said burner, a driving means, a mechanism for moving said portion of said pump and for operating said air regulating means, means controlled by the temperature of said device for closing an electrical circuit, electro-magnetic means actuated by the closing of said circuit to connect said mechanism to said driving means, and means operated by said mechanism for breaking said circuit and de-energizing said electro-magnetic means, whereby said mechanism is disconnected from said driving means.

8. A regulating means for a device heated by a burner to which oil and air are supplied, having in combination, means for delivering oil to said burner adjustable to vary the discharge therefrom, an air regulating means for varying the supply of air to said burner, means for simultaneously adjusting said two means to vary the supply of oil and air to said burner, an electrical circuit, means responsive to the temperature of said device for closing said circuit, an electromagnetic means actuated by the closing of said circuit for actuating said third mentioned means, and a switch operated by the closing of said circuit for cutting out of said circuit said means responsive to the temperature of said device and maintaining said electro-magnetic means energized.

WAYBURN E. JOHNSTON.